United States Patent
Kuwabara (10) Patent No.: US 7,248,732 B2
(45) Date of Patent: Jul. 24, 2007

(54) PATTERN INSPECTION METHOD AND INSPECTION APPARATUS

(75) Inventor: Masayuki Kuwabara, Hachioji (JP)

(73) Assignee: Tokyo Seimitsu Co., Ltd, Tokyo (JP)

( * ) Notice: Subject to any disclaimer, the term of this patent is extended or adjusted under 35 U.S.C. 154(b) by 722 days.

(21) Appl. No.: 10/691,904

(22) Filed: Oct. 22, 2003

(65) Prior Publication Data

US 2004/0086168 A1    May 6, 2004

(30) Foreign Application Priority Data

Oct. 23, 2002  (JP) .............................. 2002-308169

(51) Int. Cl.
*G06K 9/00*  (2006.01)
(52) U.S. Cl. ...................... 382/149; 382/170; 382/172; 356/237.4; 356/237.5
(58) Field of Classification Search .......... 257/E21.53, 257/E21.125; 270/30.02; 356/237.1, 237.4, 356/237.5, 954, FOR. 100; 382/112, 141, 382/144, 145, 149, 168–172, 190–195, 220, 382/224; 702/35, 125 FOR See application file for complete search history.

(56) References Cited

U.S. PATENT DOCUMENTS

| | | | |
|---|---|---|---|
| 5,091,963 A * | 2/1992 | Litt et al. ................... | 382/149 |
| 6,229,331 B1 | 5/2001 | Kuwabara | |
| 2002/0146171 A1 * | 10/2002 | Chandrasekhar ............ | 382/181 |

FOREIGN PATENT DOCUMENTS

| | | |
|---|---|---|
| JP | 4-107946 | 4/1992 |
| JP | 5-47886 | 2/1993 |
| JP | 11-135583 | 5/1999 |
| JP | 2000-171404 | 6/2000 |
| JP | 2002-22421 | 1/2002 |

OTHER PUBLICATIONS

Patent Abstract of Japan, Publication No. 04107946 A, Published on Apr. 9, 1992, in the name of Taniguchi et al.
Patent Abstract of Japan, Publication No. 05047886 A, Published on Feb. 26, 1993, in the name of Jingu.
Patent Abstract of Japan, Publication No. 2002022421 A, Published on Jan. 23, 2002, in the name of Hikita et al.
Patent Abstracts of Japan, Publication No. 11-135583, dated May 21, 1999, in the name of Yasuhiko Nakayama et al.

* cited by examiner

*Primary Examiner*—Matthew C. Bella
*Assistant Examiner*—G. F. Cunningham
(74) *Attorney, Agent, or Firm*—Christie, Parker & Hale, LLP (57) ABSTRACT

A pattern inspection method and apparatus, wherein the target area is limited to a line part, having a simplified configuration and capable of detecting a killer defect as a defect candidate and considerably reducing the number of non-killer defects to be detected as defect candidates, have been disclosed. The present invention relates to a pattern inspection method and apparatus for judging non-matching parts to be defects by making a comparison between the same patterns having a line part in which a line extending in the longitudinal or transverse direction appears repetitively at a fixed pitch, wherein an average level of gray level data is calculated for each pixel columns in the direction in which the line extends, a type of the area of each pixel columns is classified into groups, a threshold value is determined for each area according to the statistical processing result of the type and the difference data of each pixel column, and the difference data is judged based on the threshold value.

4 Claims, 9 Drawing Sheets

DIE-DIE COMPARISON

FIG.2B

CELL-CELL COMPARISON

PATTERN INSPECTION METHOD AND INSPECTION APPARATUS

CROSS-REFERENCE TO RELATED APPLICATION

This application claims priority of Japanese Patent Application Number 2002-308169, filed on Oct. 23, 2002.

BACKGROUND OF THE INVENTION

The present invention relates to a pattern inspection method, and a pattern inspection apparatus, for detecting a pattern defect, by comparing patterns which should be essentially the same, and judging non-matching parts as defects. More particularly, the present invention relates to an inspection method and an inspection apparatus for detecting a defect in a pattern having a line part, which is frequently found in a semiconductor wafer, a photomask, a liquid crystal display panel, and so forth, and in which a line extending in the longitudinal or transverse direction appears repetitively and at a fixed pitch.

A fixed pattern is repetitively formed on a semiconductor wafer, a semiconductor memory photomask, a liquid crystal display panel, and so forth. Therefore a pattern defect is detected currently by capturing the optical image of the pattern and comparing neighboring patterns. If no difference is found between the two patterns by comparison, the patterns are judged to be nondefective and if any difference is found, it is judged that a defect exists in one pattern. Since such an apparatus is generally called an appearance inspection apparatus, this term is used here. In the following description, a semiconductor wafer appearance inspection apparatus, which inspects the patterns formed on a semiconductor wafer for a defect, is described as an example. The present invention, however, is not limited to this case, but it is applicable to an appearance inspection apparatus for a semiconductor memory photomask, a liquid crystal display panel, and so forth, and moreover, applicable to any apparatus as long as it has a configuration in which patterns, which should be essentially the same, are compared for defect inspection.

Figure 1:
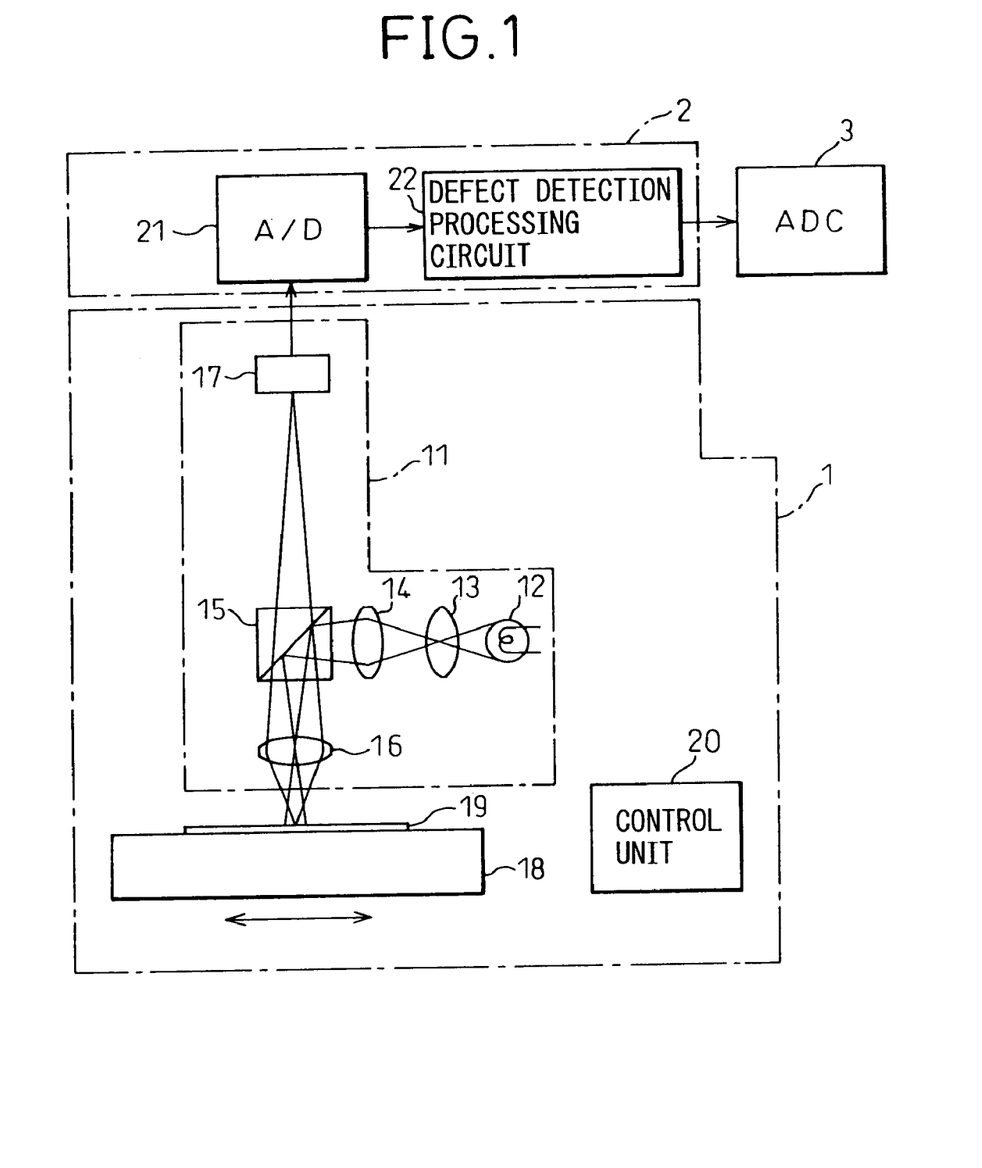
FIG. 1 is a diagram that shows the general configuration of a semiconductor wafer appearance inspection apparatus.

The manufacture of a semiconductor device includes a great number of processes and it is important to detect the occurrence of defects in the final and intermediate processes and to feed back the result to the manufacturing process in order to improve the yield and, therefore, an appearance inspection apparatus is widely used to detect defects. FIG. 1 is a diagram that shows the general configuration of a semiconductor wafer appearance inspection apparatus. As shown in FIG. 1, the semiconductor wafer appearance inspection apparatus comprises an image generation section 1 that generates an image signal, of the surface of a semiconductor wafer, a defect candidate detection section 2 that detects a part that has the possibility of being a defect (defect candidate) by converting the image signal into digital data and comparing identical patterns, and an automatic defect classification (ADC) section 3 that analyzes and classifies defect candidates into two groups, that is, a group of fatal defects (killer defects) that affect the yield and a group of non-killer defects that can be ignored.

The image generation section 1 comprises a stage 18 that holds a semiconductor wafer 19, an optical system 11 that generates the surface image of the semiconductor wafer 19, and a control unit 20. The optical system 11 comprises a light source 12, illuminating lenses 13 and 14 that converge the illuminating light from the light source 12, a beam splitter 15 that reflects illuminating light and passes through image light, an objective lens 16 that irradiates the surface of the semiconductor wafer 19 with illuminating light and at the same time that projects the optical image of the surface of the semiconductor wafer 19, and an image pickup device 17 that converts the projected optical image of the surface of the semiconductor wafer 19 into an electrical image signal. As for the image pickup device 17, a TV camera employing a two-dimensional CCD element or the like can be used, but in most cases, a line sensor, such as a one-dimensional CCD, is used to obtain an image signal with high resolution and images are captured by relatively moving (scanning) the semiconductor wafer 19 using the stage 18. Therefore, if optical images are captured by the line sensor in the course of movement of the semiconductor wafer 19 in the direction of the repetitive array of patterns, the image signal of the same part of the pattern is eventually generated at fixed time intervals. As the configuration of the image generation section 11 is widely known, a description is not given here.

The defect candidate detection section 2 comprises an analog-digital converter (A/D) 21 that converts an image signal output from the image pickup device 17 into multi-valued digital image data and a defect detection processing circuit 22 that processes the digital image data, compares the same parts of the pattern, and detects a defect candidate. The process in the defect candidate detection section 2 will be described later.

The ADC 3 analyzes the digital image data of the part of a defect candidate reported from the defect candidate detection section 2 and classifies the defect candidate as a true defect or not.

Figure 2A:
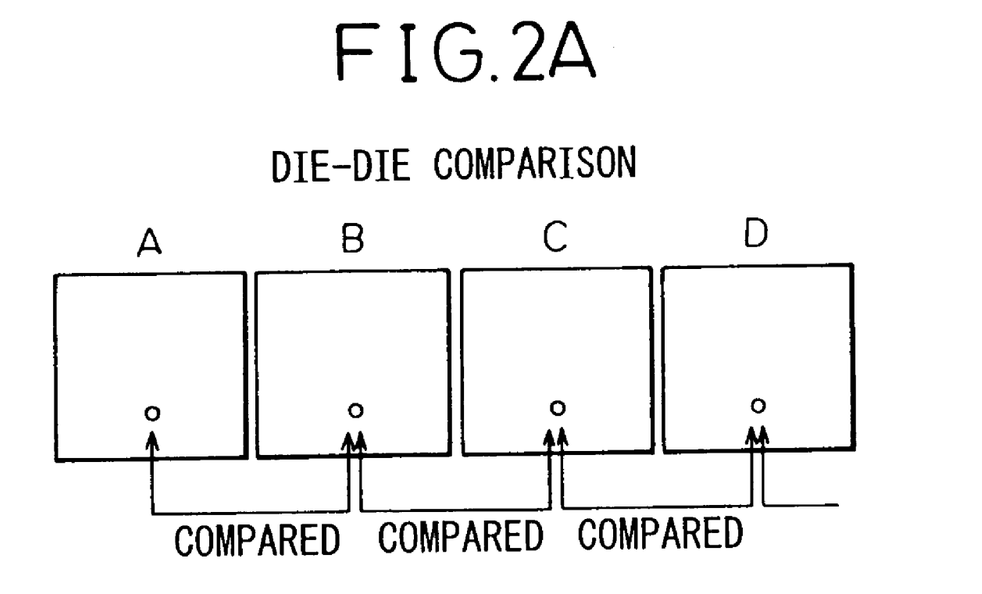
FIG. 2A and FIG. 2B are diagrams that illustrate a die-die comparison and a cell-cell comparison in the semiconductor wafer appearance inspection apparatus.

Next, the process in the defect detection processing circuit 22 is further described. As described above, a plurality of semiconductor chips (dies) are formed on the semiconductor wafer so as to be regularly arranged. The pattern of each die is identical because the same mask pattern is used. Therefore, the same pattern appears repetitively at a pitch of the die array as shown in FIG. 2A, and a comparison between the same parts of two neighboring dies is made. Such a comparison is called the die-die comparison. If there is no defect, the patterns coincide with each other, but there will be a difference in the comparison results if there exists a defect. Even if there exists a difference, however, it is not possible to determine which one of the two dies is defective by a one-time comparison. Then, the comparison is made twice with the dies on both sides of each die as shown in FIG. 2A, and the part is judged to be non-defective if no difference is found by the two-time comparison and the part is judged to be defective if a difference is found by each comparison of the two-time comparison. This judging method by the two-time comparison is called the double detection. The judging method by the one-time comparison is called the single detection. In either case, both judging methods for identifying a defect, in which a comparison is made between two neighboring patterns, are based on a premise that the occurrence frequency of defects is comparatively small and that there is little possibility of the existence of defects on the same part of patterns to be compared at the same time, and in fact the occurrence frequency of fatal defects in patterns formed on a semiconductor wafer is very low in the manufacturing process and, therefore, such a premise does not lead to any problem.

As described above, the semiconductor wafer 19 is scanned by the optical system 11 that has a line sensor 17, and the image data corresponding to the scan width is generated sequentially as the scanning time elapses. Therefore, when double detection is carried out, the image of die A is delayed by one repetition period and compared with the image of die B sequentially, then similarly, the image of die B is delayed by one repetition period and compared with the image of die C sequentially, and thus the double detection process of die B is completed, as shown in FIG. 2A. Similarly, the double detection process is repeated for dies C, D, . . . , until the process is completed for all dies. Although the process for the first die A is the single detection process, it is effective because die B has been already inspected and a part of die A non-matching with die B can be judged to be a defect, but it is also applicable to compare die A with another die. The image data of the die for which the two-time comparison has been made can be deleted sequentially, and if it is designed so that the image data of the next die is stored in the part of memory from which the previous data has been deleted, the memory capacity is sufficient as long as it can store data corresponding to image data of a die. In other words, the memory in this case functions as a delay memory that delays image data by one repetition period. It is also applicable to provide a memory with a capacity large enough for the image data of all dies on a semiconductor wafer. In this case, an enormous memory capacity is required, but it is no longer necessary to generate the image data again by scanning the semiconductor wafer for the analysis of the defective part in the ADC 3.

Figure 2B:
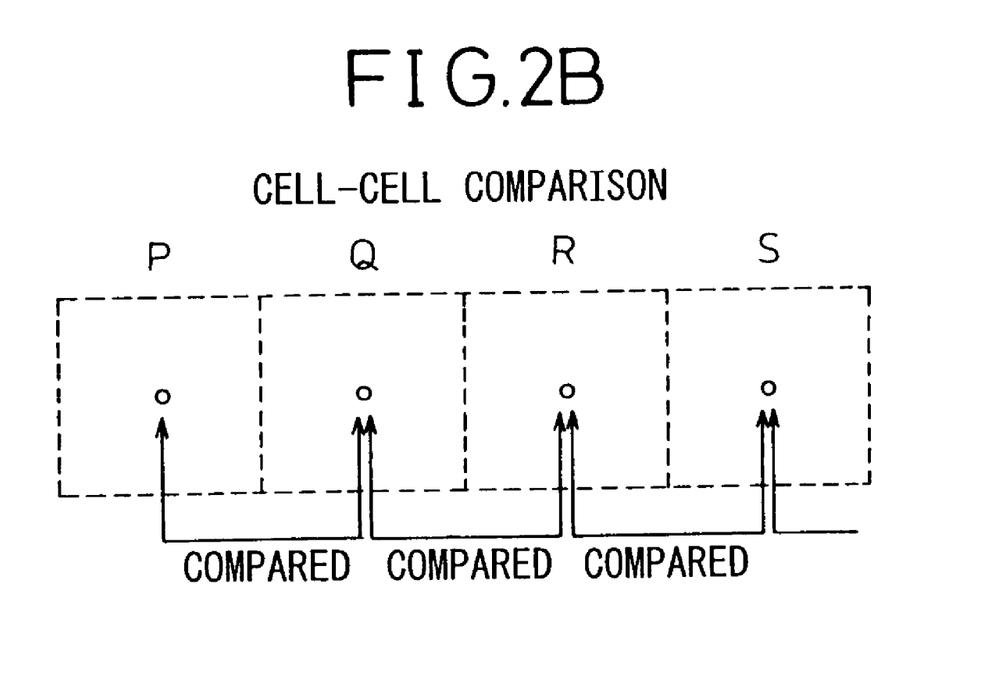

A unit pattern called a cell is arranged repetitively at a fixed period in the memory cell array of a semiconductor memory. In such a part, a comparison between cells can be made, and such a comparison is called the cell-cell-comparison. FIG. 2B shows the cell-cell-comparison and the double detection process is sequentially carried out between two neighboring cells among cells P–S in the same manner as the die-die comparison.

Figure 3:
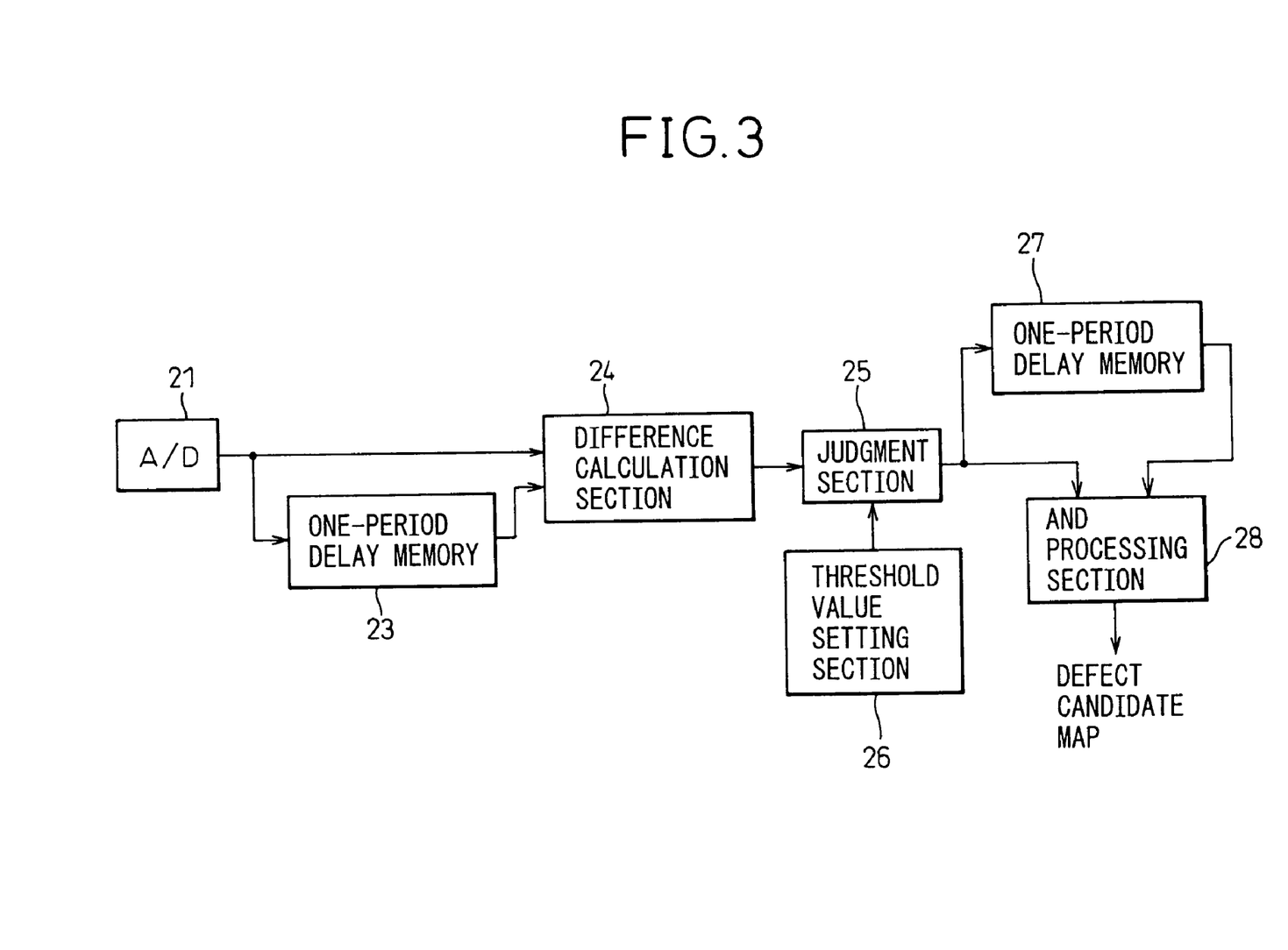
FIG. 3 is a block diagram that shows the configuration of a defect detection processing circuit in a conventional semiconductor wafer appearance inspection apparatus.

FIG. 3 is a block diagram that shows the configuration of the defect candidate detection section 2. As shown schematically, the defect candidate detection section 2 comprises the A/D 21 that sequentially outputs digitized multi-valued (gray level) image data 100, a one-period delay memory 23 that delays gray level data by an amount of time corresponding to one repetition period (die array pitch in the case of the die-die comparison, and cell array pitch in the case of the cell-cell comparison), a difference calculation section 24 that calculates difference data that is the difference between the gray level data that the A/D 21 outputs and the delayed gray level data that the one-period delay memory 23 outputs, that is, the difference between two pieces of the gray data that correspond to neighboring parts, a judgment section 25 that judges the part to be a defect candidate when the difference data is found to be larger than a threshold value by comparison, and a threshold setting section 26 that sets a threshold value. With the above-mentioned configuration, the single detection can be carried out. The defect candidate detection section 2 shown schematically comprises a one-period delay memory 27 that delays the output of the judgment section 25 by one period and an AND processing section 28 that calculates a logical sum (AND) of the output of the judgment section 25 and the output of the one-period delay memory 27, and the double detection is carried out by these parts.

The double detection process must be performed in synchronization with generation of image data and a very high-speed processing ability is required. Although a circuit to perform such a process can be realized by a configuration in which a delay memory and a comparison circuit are combined, in most cases, it is realized by a configuration containing a pipeline processing data processor and a working memory because it is difficult to align positions for comparison and make the repetition period variable.

It is essential for a semiconductor wafer appearance inspection apparatus to be capable of detecting every part that includes a difference without fail, therefore, it is designed so as to recognize a part, as a defect, at which the difference between the two images exceeds a fixed threshold value, as described above. Therefore, the number of the parts judged to be a defect candidate depends considerably on the specified threshold value. As described above, the part judged to be a defect candidate is reported to the ADC 3 and it is determined whether it is a fatal defect (killer defect) that affects the yield of the semiconductor device. A problem, however, is caused that the time required for analysis increases if the number of the defect candidates increases and the throughput is degraded, because it is difficult to perform the pipeline processing of this part and a considerable time is required for the analysis of one part. Therefore, it is preferable that the double detection circuit 22 detects every killer defect as a defect candidate without fail, but detects as few non-killer defects as possible as a defect candidate.

There is, however, another problem that it is difficult to meet the demand only with the setting of a threshold value because the part at which the difference between two images is large is not always a killer defect. In the metal process of a semiconductor device, for example, the killer defect that users want to detect is a defect such as a short between patterns and it is preferable if a non-killer defect such as a metal grain is separated from a defect candidate. Generally in most cases, however, the difference in gray level caused by a metal grain is by far larger than that caused by a short between patterns. Therefore, if a threshold value is set to a value so that a metal grain is not at all detected as a defect candidate, a short between patterns, which should be primarily detected, is hardly detected. As a result, a threshold value is set to a value so that a short between patterns is detected without fail, and both a short and a metal grain are detected temporarily as a defect candidate, and then the ADC 3 classifies them according to whether it is a killer defect or not.

Conventionally, the ADC 3 was not provided and the classification was performed by a visual inspection of each defect candidate that had been moved again to the stage of a microscope by using an appearance inspection apparatus or another apparatus called a review station, therefore, an enormous amount of time was required for classification when there occurred many metal grains. Recently, the trend is toward automation of classification by providing the ADC 3, but for the automatic classification to be realized, the image of the die that includes the detected defect candidate and at least one of the die images used in the comparison are needed, and it is necessary to obtain these images again, send them to the ADC 3, and detect the defect candidate again before the defect classifying process is performed. If a memory with a capacity large enough to store the image data of all dies on one semiconductor wafer is provided, as described above, it is no longer necessary to obtain image data of the semiconductor wafer again for analysis of defective parts in the ADC 3, but the memory capacity required for the image data of all the dies is tremendously large, resulting in considerable increase in cost.

As described above, the double detection circuit performs the comparison process at a high speed such as, for example, 1G pixel/second, in order to realize a high throughput and, therefore, this part forms a considerable proportion of the cost of the appearance inspection apparatus. In other words, it can be said that the cost of the apparatus and the throughput thereof are in a trade-off relationship, and the processing performance of the double detection circuit (a pipeline processing data processor and a memory) used to be specified, various factors being taken into consideration. As a result, for example, an upper limit is set to the number of defect candidates that can be reported per unit processed image, and when the number of detected defect candidates exceeds the upper limit, it is reported that a large defect exists in the unit processed image. As described above, there is a problem that a tremendous cost and processing time are required in order to send two pieces of image data relating to all of the detected defect candidates to the automatic defect classification (ADC) section and detect again the defect candidates among all of the defect candidates for classification in the ADC.

Figure 4A:
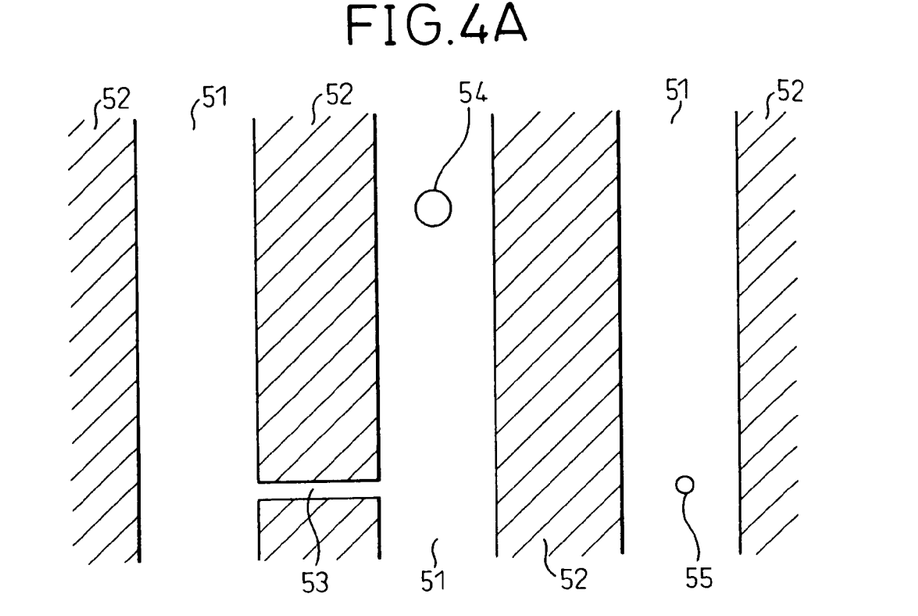
FIG. 4A and FIG. 4B are diagrams that illustrate an example of a defect detection process using a metal wire layer in a semiconductor device as an example.
Figure 4B:
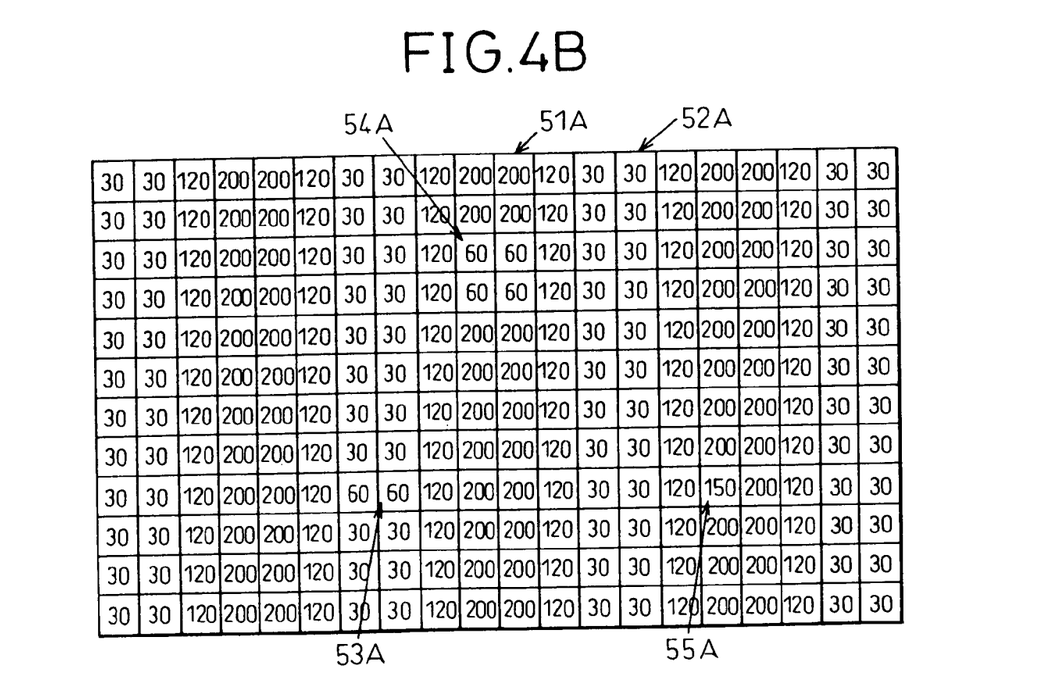

An example of the defect detection process is described using a case where the image of a semiconductor memory metal wire layer is captured by a bright field microscope. The metal wire layer, which corresponds to the memory array of a semiconductor memory, has a pattern in which a line extending in one direction appears repetitively at a fixed period. Such a part is called a line part here. FIG. 4A is an example of a pattern of the line part of a semiconductor memory metal layer, and FIG. 4B shows a gray level image of the line part captured by a bright field microscope.

As shown in FIG. 4A, metal wires 51 and spaces 52 therebetween are arranged at fixed intervals. Reference number 53 refers to a pattern short, which is a killer defect, reference number 54 refers to a large metal grain, which is a non-killer defect, and reference number 55 refers to a small metal grain, which is also a non-killer defect. As shown in FIG. 4B, the reflectance of the part of the metal wire 51 is high and the gray level is as high as 200, and that of the space 52 is low and the gray level is as low as 30. As the part at which a defect of a pattern short exists always corresponds to the space part, the gray level of the pattern short part is higher than that of the normal reference part with which a comparison is made. In concrete terms, while the gray level of the space part is 30, which is the reference part, that of the pattern short part is 60.

Figure 5:
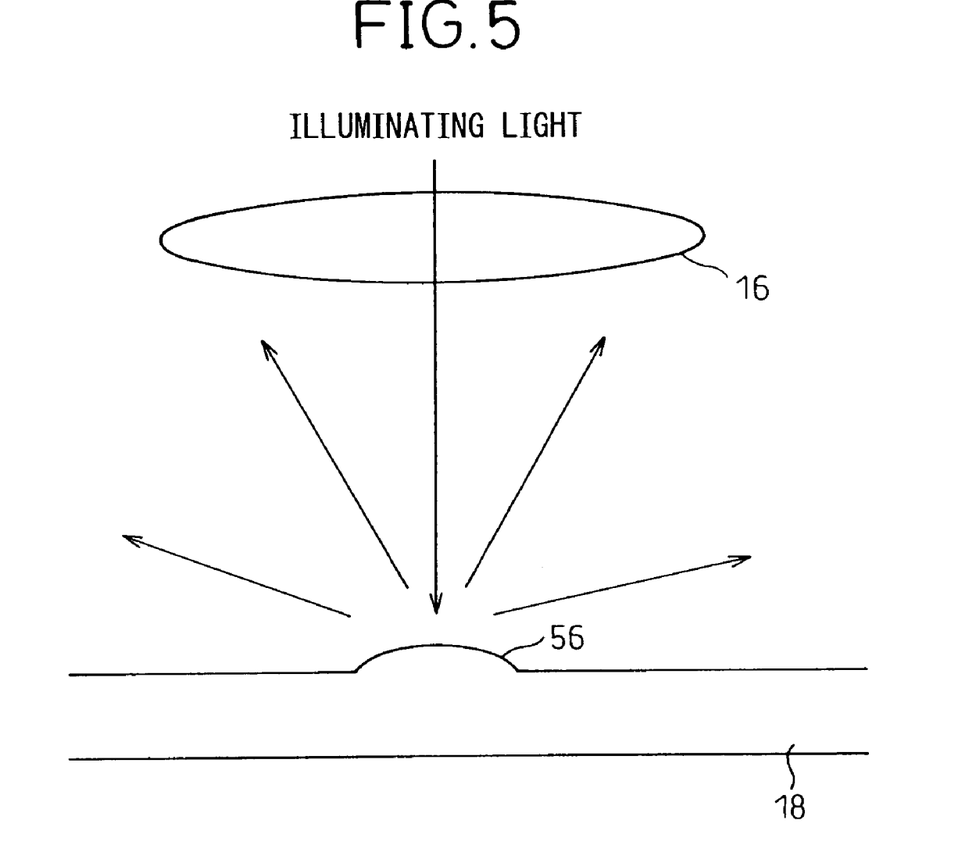
FIG. 5 is a diagram that illustrates the decrease in reflectance by a metal grain.

Generally, a metal grain has a sectional structure as shown in FIG. 5, and illuminating light that enters through an objective lens is scattered by the grain, therefore, the gray level becomes low. In other words, the gray level of the grain part is lower than that of the normal metal wire part without a grain, which is the reference part, when compared with each other. In concrete terms, while the gray level of the metal wire part is 200, which is the reference part, that of the large grain part 54 is 60 and that of the small grain part 55 is 150.

In this example, that is, in the conventional judging method in which the absolute value of a difference between images is compared with a single threshold value, it is unlikely that on one hand a pattern short between metal wires is detected, and on the other hand a grain on the metal wire avoids detection. This is because the difference in gray level between the pattern short part and the normal space part is only 30, but that between the small grain part and the normal metal wire part is 50. In other words, the setting of a threshold value will be a big problem.

Therefore, various methods for determining a threshold value have been proposed. For example, in Japanese Unexamined Patent Publication (Kokai) No. 4-107946, a method has been disclosed in which differences in gray level are calculated at multiple parts of a pattern and a threshold value is determined based on the statistics of them. In Japanese Unexamined Patent Publication (Kokai) No. 5-47886, a method has been disclosed in which an approximation of a curve is calculated from the relationship between the gray level difference and the frequency, and a gray level difference at which the value of the approximation of the curve becomes zero is taken as an optimum threshold value. In Japanese Unexamined Patent Publication (Kokai) No. 2002-22421, a method has been disclosed in which an error probability conversion is carried out based on the standard deviation.

Moreover, in Japanese Unexamined Patent Publication (Kokai) No. 2000-171404, a method and an apparatus for inspecting a pattern have been disclosed, in which, by using an elongated filter, an average gray level and a range in which the gray level changes within the filter are calculated, thereby a direction in which the line pattern extends is detected and at the same time each pixel is classified into a group, and an optimum threshold value is set.

As described above, the metal wire layer of a memory cell array of a semiconductor memory element has a line part and because the metal wire line appears repetitively at a very fine pitch in this line part, a defect is more likely to occur and the grain also does. Therefore, a pattern inspection method and a pattern inspection apparatus, having a simplified configuration and a high processing speed, and capable of detecting a killer defect in a line part in a highly sensitive manner without detecting a non-killer defect, are desired, even though the target range is limited only to the line part.

SUMMARY OF THE INVENTION

The object of the present invention is to realize a pattern inspection method and a pattern inspection apparatus having a simplified configuration and capable of not only detecting a killer defect as a defect candidate but also considerably reducing the number of non-killer defects to be detected as a defect candidate, even though the target range is limited to only a line part.

In order to realize the above-mentioned object, the pattern inspection method and the pattern inspection apparatus of the present invention are characterized in that, as to a line part, an average level of gray level data is calculated for each pixel column in the direction in which a line extends and the type of the area of each pixel column is classified into groups, a threshold value is determined for each area based on the statistic process result of the type and the difference data of each pixel column, and the difference data is judged based on the threshold value.

In other words, in the pattern inspection method and apparatus of the present invention, a pattern having a line part where a line extending in the longitudinal or transverse direction appears repetitively at a fixed pitch is compared with another identical pattern, and a non-matching part is judged to be a defect, and the pattern inspection method and the apparatus are characterized in that the image of the pattern is captured and the gray level data is created, the difference in the gray level data between two corresponding pixels of the patterns to be compared is calculated and thus difference data is created, an average level of the gray level data for each pixel column in the direction in which the line extends is calculated in a fixed range in the line part and average gray level data is created, the average gray level data is statistically processed and the type of an area to which each pixel column belongs is determined, a threshold value is determined for each area according to the statistical process result of the type of the area and the difference data for each pixel column, the difference data in each area is compared with the threshold value, and the part where the difference data is larger than the threshold value is judged to be a defect.

The direction in which the line extends and the fixed range in the line part are determined and set based on the data of the pattern to be inspected. It is possible to manually make the judgment or to provide a means for automatically analyzing the data of the pattern to be inspected.

Although the target area is limited to a line part in the present invention, it is possible to securely classify the types of an area of each pixel (pixel column) into groups with a simplified configuration, therefore, it is also possible to securely detect a killer defect as a defect candidate and considerably reduce the number of non-killer defects (grains) to be detected as a defect candidate because a proper threshold value can be set according to the classification.

BRIEF DESCRIPTION OF THE DRAWINGS

The features and advantages of the invention will be more clearly understood from the following description taken in conjunction with the accompanying drawings, wherein.

DESCRIPTION OF THE PREFERRED EMBODIMENTS

Figure 6:
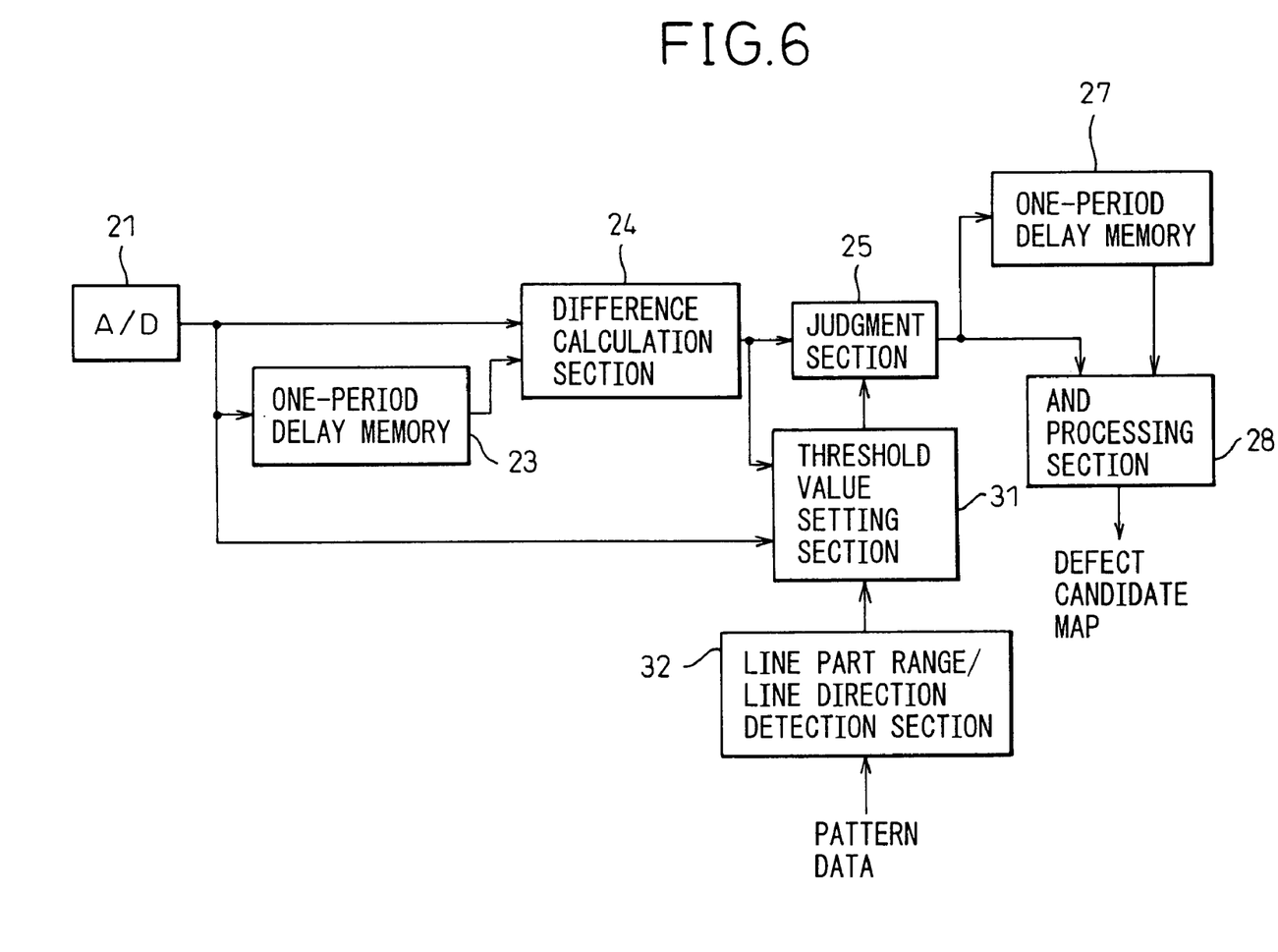
FIG. 6 is a block diagram that shows the configuration of a defect detection processing circuit in a semiconductor wafer appearance inspection apparatus according to an embodiment of the present invention.

FIG. 6 is a block diagram that shows the configuration of a defect candidate detection section 2 in the semiconductor wafer appearance inspection apparatus according to the embodiment of the present invention. Other parts are the same as the prior art shown in FIG. 1. Here, the object is a semiconductor memory wafer, which has a pattern having a line part where a line extending in one direction appears repetitively. It is assumed that such a line part corresponds to a memory cell section in a semiconductor memory, the memory cell section is arranged in a chip (die), and a defect is detected by a cell-cell comparison of them. However, the present invention is not limited to this, but can be applied to a pattern having a line part and can also be applied to a case where a die-die comparison is made. As for the parts other than the line part, the same defect detection process similar to the prior art is applied.

As shown schematically, the defect candidate detection section in the present embodiment differs from the conventional defect candidate detection section shown in FIG. 3 in that a threshold value setting section 31 has a different configuration and a line part range/line direction detection section 32 is provided.

The line part range/line direction detection section 32 obtains the range of the line part and the line direction by analyzing the pattern data of an object to be inspected, and sends the information to the threshold value setting section 31. It is also possible for an operator to determine the line part range and the line direction by analyzing the pattern data and input the information to the threshold value setting section 31 providing the line part range/line direction detection section 32.

Figure 7:
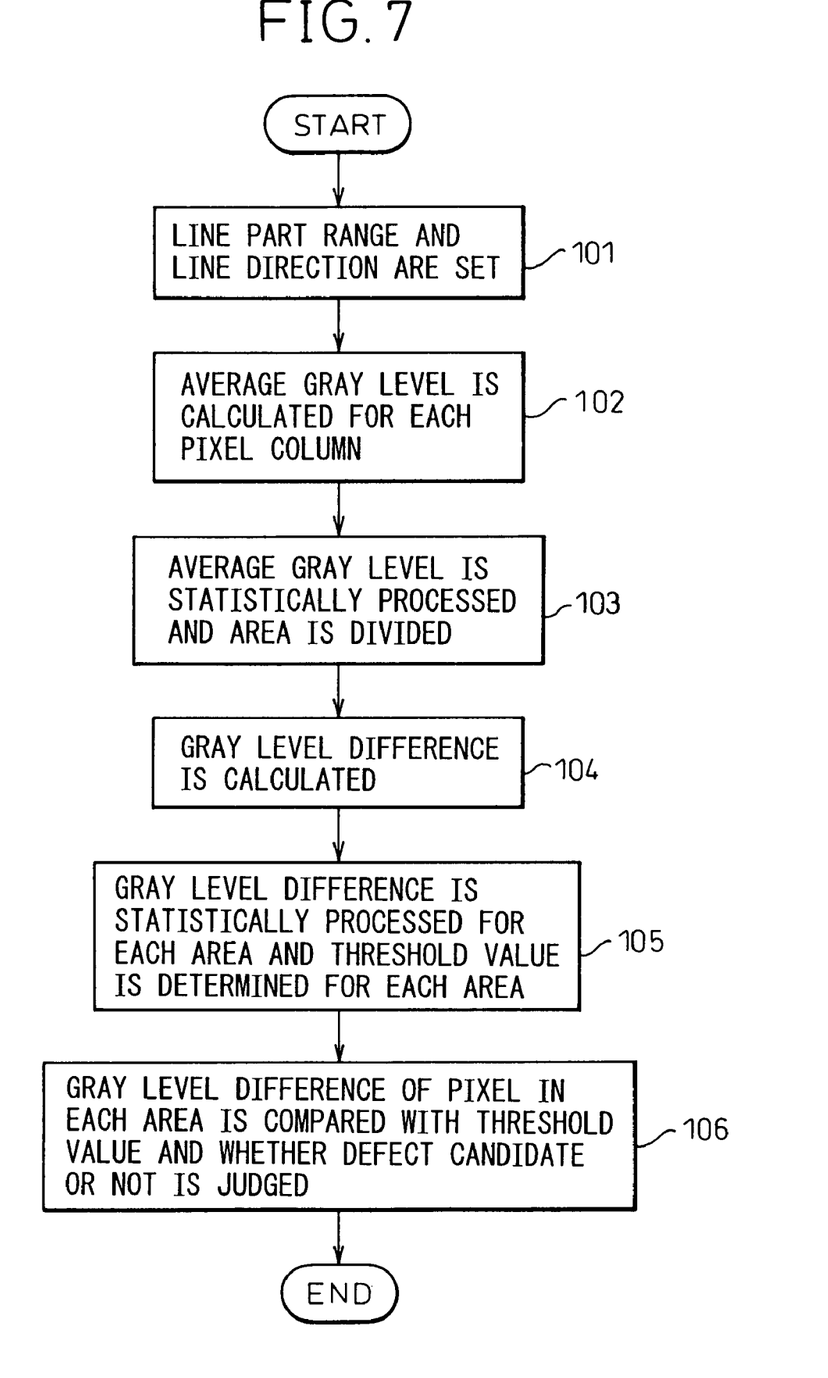
FIG. 7 is a flow chart that shows a defect candidate detection process in an embodiment.

FIG. 7 is a flow chart that shows the process in the defect candidate detection section in the present embodiment.

In step 101, the line part range and the line direction are set by the line part range/line direction detection section 32. It is assumed that a stage 18 in the semiconductor wafer appearance inspection apparatus in the present embodiment is provided with a high precision position/direction aligning mechanism, and the direction of the pattern line of the semiconductor memory and the direction of the pixel column can be adjusted so that they are exactly identical.

Figure 8A:
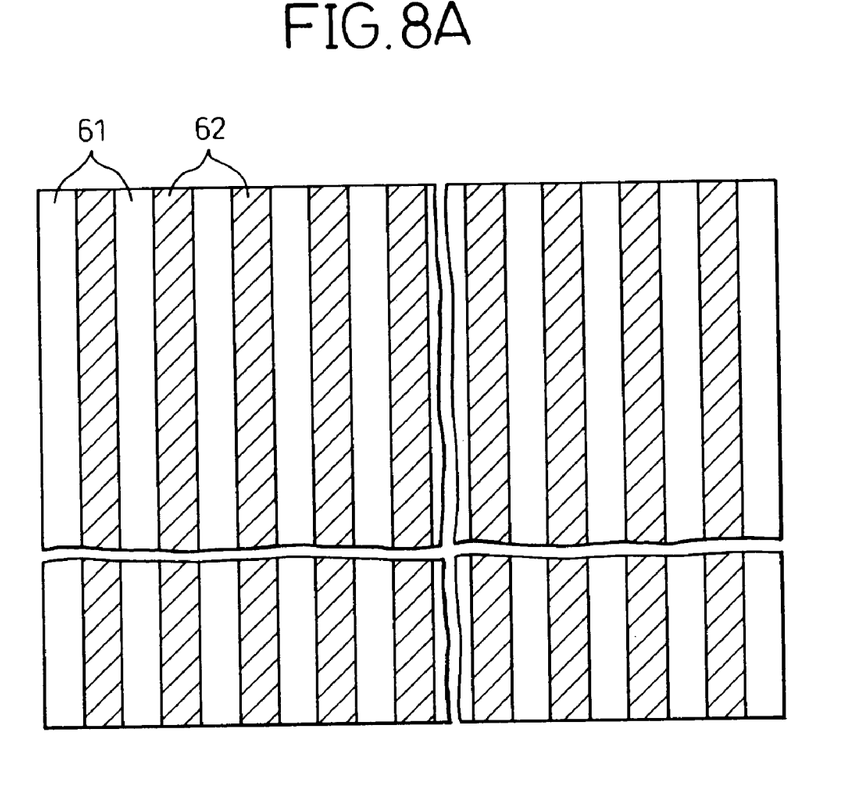
FIG. 8A and FIG. 8B are diagrams that show an image example and the change in average gray level in an embodiment.

It is assumed that an image is obtained as an image of the line part, in which bright lines 61 and dark lines 62 are arranged alternately at a fixed pitch as shown in FIG. 8A. It is also assumed here that a TDI (Time Delay Integrated) sensor is used as a pickup device 17 in the present embodiment, a logic frame is an image composed of 1,000 pixels in the scan direction and 128 pixels in the TDI direction, and a logic frame image is processed as an object. When the size of a cell part is larger than a logic frame, the logic frame is set as a line part and when the size of a cell part is smaller than a logic frame, the cell part is set as a line part. It is also possible, however, to combine a logic frame with another to make a large line part when the cell part is large.

Figure 8B:
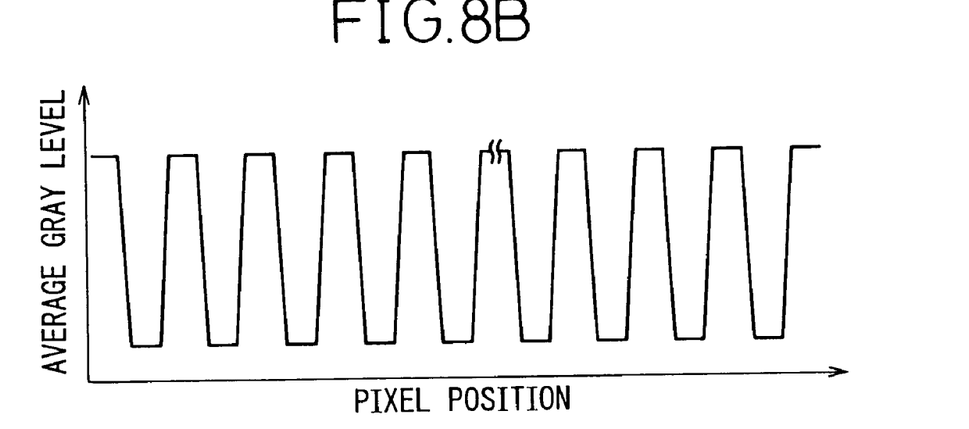

In step 102, the threshold value setting section 31 calculates the average of gray levels for each pixel column in the direction in which a line extends in the line part range. The gray level average changes as shown in FIG. 8B when the image is such an image shown in FIG. 8A because even grains and short defects are averaged. When the gray level average is calculated, if the line part is large enough, a large error is unlikely to occur even if the gray level average is calculated using some sampled pixels instead of using every pixel in the pixel column corresponding to the length of the line part. As a standard, about 20 pixels, for example, are enough for sampling. When the line part is small and the number of pixels is less than 20, it is recommended to use the data of a logic frame neighboring in the direction in which the line extends, or to apply the same process as used in the prior art.

Figure 9:
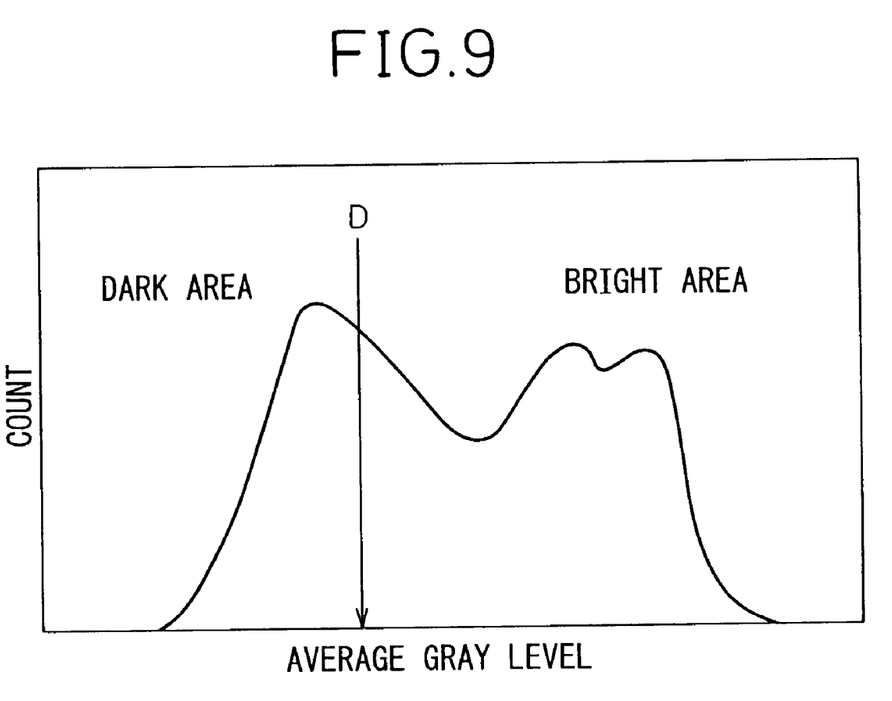
FIG. 9 is a diagram that shows an example of a histogram of average gray levels.

In step 103, the threshold value setting section 31 creates a histogram of gray level averages. FIG. 9 shows an example of the histogram and a point at which the density (number of pixels) is equal to a fixed value D is selected from the dark area (area where the average gray level is low) and the area is divided into the dark area and the bright area by a vertical line that passes through the point. The fixed density D is determined by the ratio of the width of the wire line (bright area) to the area (dark area) between them in the line part, and if, for example, the width of the wire line is half the pitch of repetition, the fixed density D is 50%, and if the width of the wire line is 30% of the pitch of repetition, the fixed density D is 70%.

Next, the area of the histogram is divided into some types of areas. For example, when the area is divided into a bright area and a dark area, the area is divided by a line corresponding to the fixed density D. When the pixel pitch is not the same as the line pitch, there exists an intermediate gray level pixel and, in this case, it is desirable to divide the area into three or more areas by setting an intermediate area(s) between the bright area and the dark area.

It is necessary to perform the processes in steps 101 to 103 on only one of two images to be compared, but of course they can be performed on both images. In this case, because the position alignment and correction are performed accurately, almost the same results are eventually obtained from the two images.

In step 104, a difference calculation section 24 calculates the difference between two images to be compared and calculates the gray level difference (difference image). This process can be performed concurrently with the processes in steps 101 to 103 described above.

In step 105, a threshold value is determined for each area determined in step 103 based on the result of the statistical process of the gray level differences of the pixels in the pixel columns belonging to the area. There can be various methods for determining a threshold such as a method in which a certain proportion of the average gray level difference is taken as a threshold for each area and a method in which a threshold value is determined by creating a histogram of gray level differences for each area.

It is also possible to set a fixed threshold value for each area without performing step 105.

In step 106, the gray level difference of pixels in each area is compared with the threshold value determined for each area, as described above, and the area is judged to be a defect candidate when the gray level difference is larger than the threshold value.

In general, the metal wire line has a high gray level and is grouped into the bright area and the area between the metal wire lines is grouped into the dark area, therefore, if the threshold value in the bright area is set to a value sufficiently larger than the threshold value in the dark area, a metal wire grain, which is a non-killer defect, is not detected as a defect candidate, but a short between metal wires, which is a killer defect, is detected as a defect candidate, as a result.

According to the present invention, as described above, although the applicable area is limited to a line part where a line appears repetitively, it is possible to obtain the effect that a pattern inspection method and a pattern inspection apparatus having a simplified configuration can be realized, which are capable of easily grouping each pixel of an image into some areas and setting a proper threshold value for each value, whereby a killer defect is detected, as a defect candidate, and the number of non-killer defects to be detected, as defect candidates, can be considerably reduced.

I claim:

1. A pattern inspection method for judging non-matching parts to be defects by making a comparison between the same patterns having a line part in which a line extending in the longitudinal or transverse direction appears repetitively at a fixed pitch, wherein gray level data is generated by capturing the image of the pattern, wherein difference data is generated by calculating the difference in the gray level data between corresponding pixels of patterns to be compared, wherein average gray level data is generated by calculating the average level of the gray level data for each pixel column in the direction in which the line extends in a fixed range in the line part, wherein a type of the area to which each pixel column belongs is determined by statistically processing the average gray level data, wherein a threshold value is determined for each area according to the statistical processing result of the type of the area and the difference data of each pixel column, and wherein the difference data of each area is compared with the threshold value and the part where the difference data is larger than the threshold value is judged to be a defect.

2. A pattern inspection method, as set forth in claim 1, wherein the direction in which the line extends, and the fixed range in the line part, are set based on the data of patterns to be inspected.

3. A pattern inspection apparatus for judging non-matching parts to be a defect by making a comparison between the same patterns having a line part in which a line extending in the longitudinal or transverse direction appears repetitively at a fixed pitch, comprising:

an image generation apparatus for generating a multi-valued image of the pattern;

a difference data generation circuit for generating difference data by calculating the difference between two patterns to be compared;

an average gray level generation section for generating average gray level data by calculating the average level of the gray level data for each pixel in the direction in which the line extends in a fixed range in the line part;

an area type determination section for determining a type of the area to which each pixel column belongs by statistically processing the average gray level data;

a threshold value determination section for determining a threshold value for each area according to the statistical processing result of the type of the area and the difference data of each pixel column; and a judgment section for comparing the difference data of each area with the threshold value and judging the part where the difference data is larger than the threshold value to be a defect.

4. A pattern inspection apparatus, as set forth in claim 3, further comprising a condition setting means for setting the direction in which the line extends and the fixed range in the line part.

* * * * *

UNITED STATES PATENT AND TRADEMARK OFFICE
CERTIFICATE OF CORRECTION

PATENT NO. : 7,248,732 B2 Page 1 of 1
APPLICATION NO. : 10/691904
DATED : July 24, 2007
INVENTOR(S) : Masayuki Kuwabara It is certified that error appears in the above-identified patent and that said Letters Patent is hereby corrected as shown below:

On the Title Page item (57) Abstract, line 12 "columns" should read --column-- item (57) Abstract, line 13 "columns" should read --column--

Signed and Sealed this

First Day of July, 2008

JON W. DUDAS
*Director of the United States Patent and Trademark Office*